US012233373B2

(12) United States Patent
Tahara et al.

(10) Patent No.: US 12,233,373 B2
(45) Date of Patent: Feb. 25, 2025

(54) DUST COLLECTOR

(71) Applicant: MAKITA CORPORATION, Anjo (JP)

(72) Inventors: Takayuki Tahara, Anjo (JP); Makoto Hotta, Anjo (JP)

(73) Assignee: MAKITA CORPORATION, Anjo (JP)

( * ) Notice: Subject to any disclaimer, the term of this patent is extended or adjusted under 35 U.S.C. 154(b) by 607 days.

(21) Appl. No.: 17/547,929

(22) Filed: Dec. 10, 2021

(65) Prior Publication Data

US 2022/0233990 A1 Jul. 28, 2022

(30) Foreign Application Priority Data

Jan. 22, 2021 (JP) .................................. 2021-008535

(51) Int. Cl.
*B01D 46/42* (2006.01)
*B01D 46/00* (2022.01)
*B01D 46/44* (2006.01)

(52) U.S. Cl.
CPC ..... *B01D 46/4263* (2013.01); *B01D 46/0047* (2013.01); *B01D 46/44* (2013.01); *B01D 2273/30* (2013.01); *B01D 2279/55* (2013.01)

(58) Field of Classification Search
CPC .......... B01D 46/4263; B01D 46/0047; B01D 46/44; B01D 2273/30; B01D 2279/55; A47L 5/22; A47L 5/365; A47L 9/2884; A47L 9/2889; A47L 9/22; A47L 9/28; A47L 9/2836

See application file for complete search history.

(56) References Cited

U.S. PATENT DOCUMENTS

| 4,120,616 | A | * | 10/1978 | Dwyer | F04D 29/4213 |
| | | | | | 417/373 |
| 6,307,358 | B1 | * | 10/2001 | Conrad | A47L 9/2821 |
| | | | | | 323/282 |
| 6,481,050 | B1 | * | 11/2002 | Wilson | A47L 9/22 |
| | | | | | 417/372 |
| 6,727,621 | B1 | * | 4/2004 | Qu | H02K 1/278 |
| | | | | | 310/179 |
| 10,383,493 | B2 | * | 8/2019 | Tahara | A47L 5/36 |
| 10,618,502 | B2 | * | 4/2020 | Norell | H02K 19/103 |
| 11,134,815 | B2 | * | 10/2021 | Liu | A47L 5/36 |
| 11,134,816 | B2 | * | 10/2021 | Tahara | A47L 9/0081 |

(Continued)

FOREIGN PATENT DOCUMENTS

| JP | S61-181429 A | 8/1986 |
| JP | H06-104098 A | 4/1994 |
| JP | 2000-093368 A | 4/2000 |

OTHER PUBLICATIONS

Apr. 2, 2024 Office Action issued in Japanese Patent Application No. 2021-008535.

*Primary Examiner* — Dung H Bui
(74) *Attorney, Agent, or Firm* — Oliff PLC

(57) ABSTRACT

A dust collector cools a controller. The dust controller includes a body housing, a motor located inside the body housing, a fan rotatable by the motor, a controller that controls the motor, and a thermal insulator between the motor and the controller. The thermal insulator defines a flow channel through which an airflow generated by the fan passes.

17 Claims, 10 Drawing Sheets

(56) References Cited

U.S. PATENT DOCUMENTS

| | | | |
|---|---|---|---|
| 11,759,076 B2* | 9/2023 | Tahara | A47L 7/0028 15/319 |
| 2004/0111825 A1* | 6/2004 | Kaufman | A47L 7/0042 15/353 |
| 2005/0000054 A1* | 1/2005 | Ninomiya | A47L 7/04 15/1.51 |
| 2006/0156504 A1* | 7/2006 | Bruneau | A47L 5/22 15/301 |
| 2011/0146025 A1* | 6/2011 | Tanimoto | A47L 7/0028 15/347 |
| 2013/0318741 A1* | 12/2013 | Moyher, Jr. | A47L 11/4083 15/327.1 |
| 2015/0223658 A1* | 8/2015 | Holsten | A47L 9/2821 200/61.2 |
| 2017/0246572 A1* | 8/2017 | Park | F24F 8/80 |
| 2018/0160872 A1* | 6/2018 | Hayamitsu | H02K 3/345 |
| 2018/0220861 A1* | 8/2018 | Zhang | A47L 7/0028 |
| 2019/0159643 A1* | 5/2019 | Machida | A47L 9/2857 |
| 2019/0167051 A1* | 6/2019 | Takayama | A47K 10/48 |

\* cited by examiner

DUST COLLECTOR

CROSS-REFERENCE TO RELATED APPLICATIONS

This application claims the benefit of priority to Japanese Patent Application No. 2021-008535, filed on Jan. 22, 2021, the entire contents of which are hereby incorporated by reference.

BACKGROUND

1. Technical Field

The present disclosure relates to a dust collector.

2. Description of the Background

In the field of dust collectors, an electric vacuum cleaner including a control board (controller) is known as described in Japanese Unexamined Patent Application Publication No. 2000-093368.

BRIEF SUMMARY

Such a controller generates heat. The controller is thus to be cooled.

One or more aspects of the present disclosure are directed to a technique for cooling a controller.

A first aspect of the present disclosure provides a dust collector, including:
a body housing;
a motor located inside the body housing;
a fan rotatable by the motor;
a controller configured to control the motor; and
a thermal insulator between the motor and the controller, the thermal insulator defining a flow channel through which an airflow generated by the fan passes.

The structure according to the above aspect of the present disclosure cools the controller.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as front and rear (or forward and backward), right and left (or lateral), and up and down (or vertical). The terms indicate relative positions or directions with respect to the center of a dust collector 1.

Dust Collector

Figure 1:
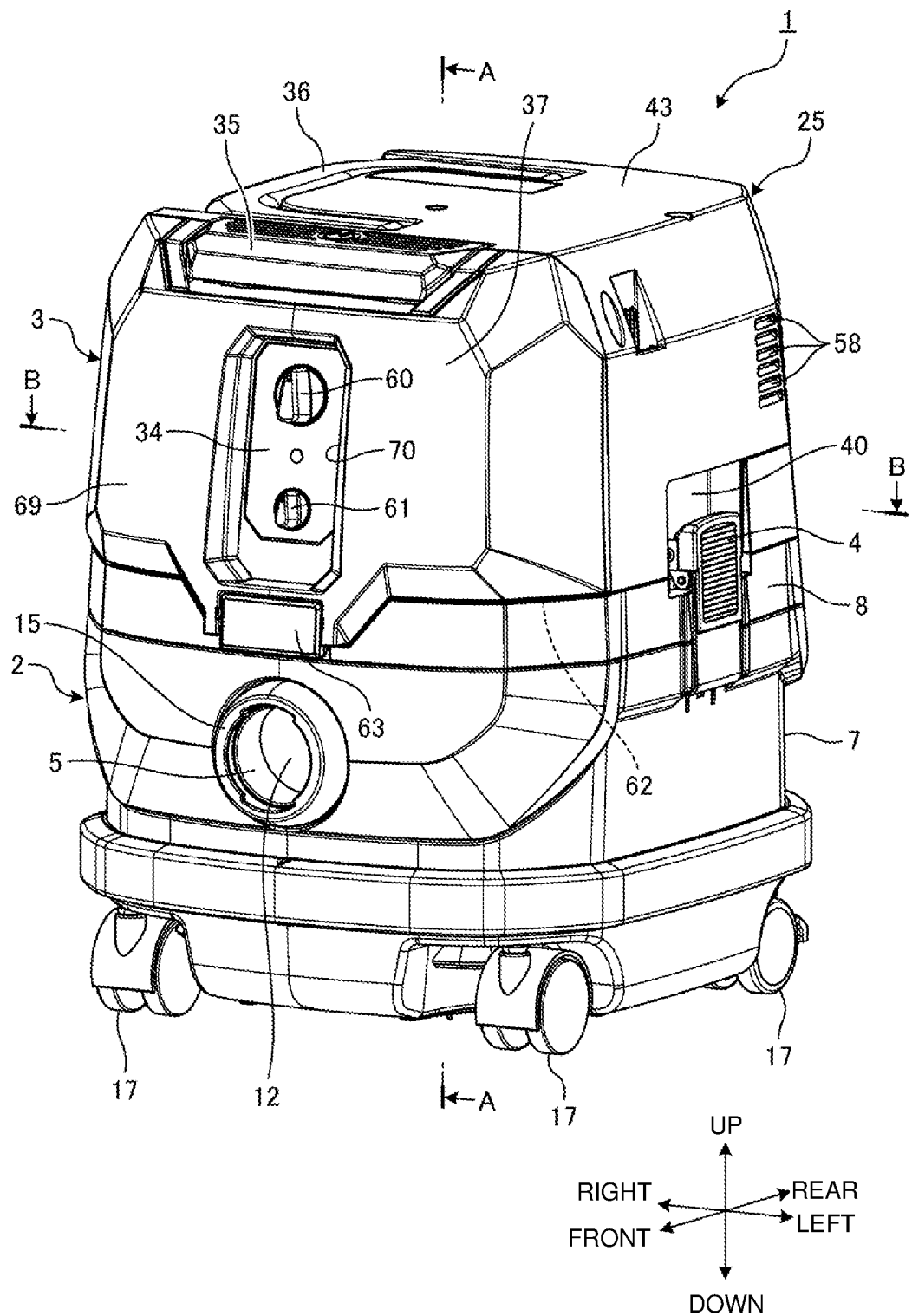
FIG. 1 is a perspective view of a dust collector according to an embodiment as viewed from the left front.
Figure 2:
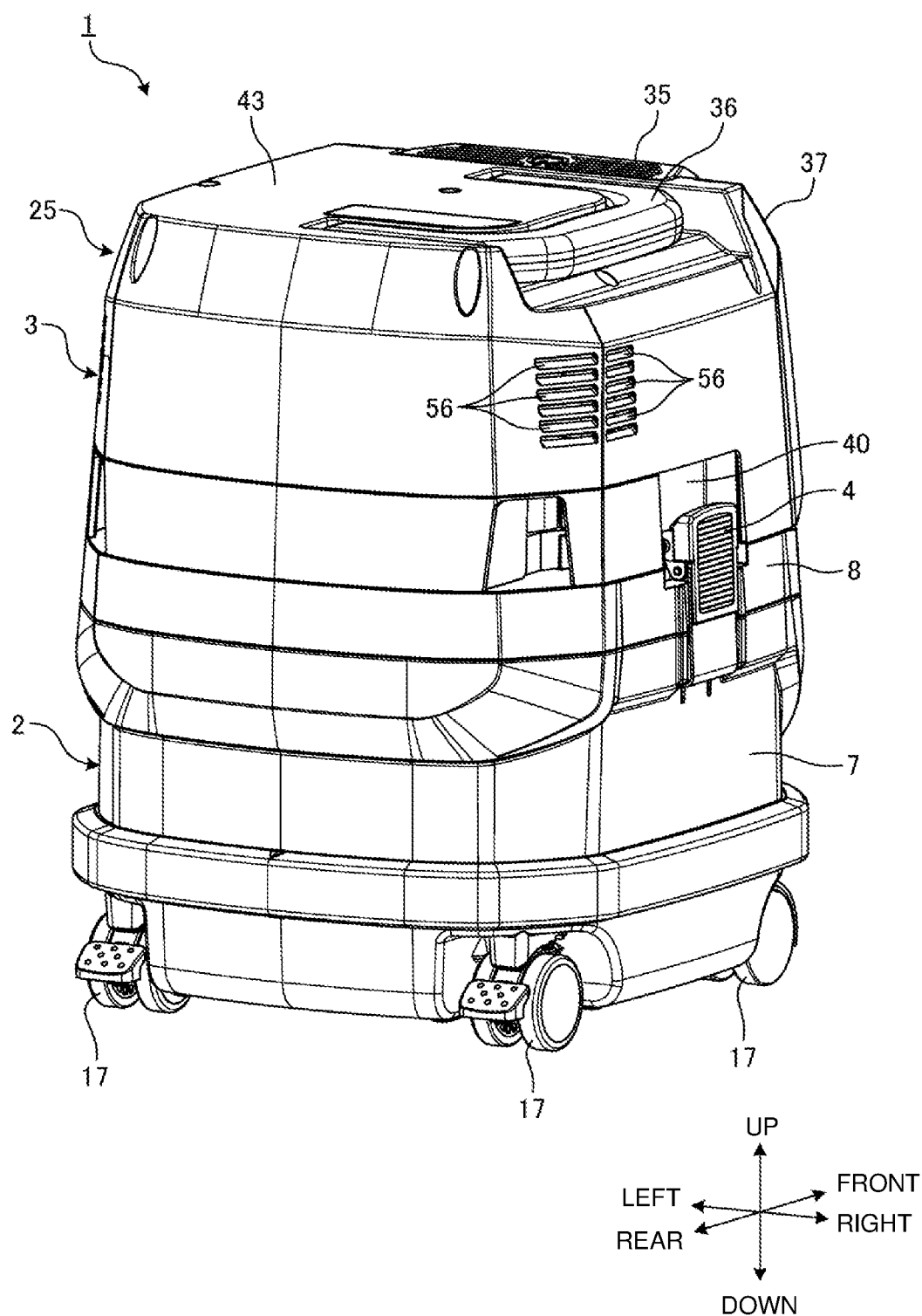
FIG. 2 is a perspective view of the dust collector according to the embodiment as viewed from the right rear.
Figure 3:
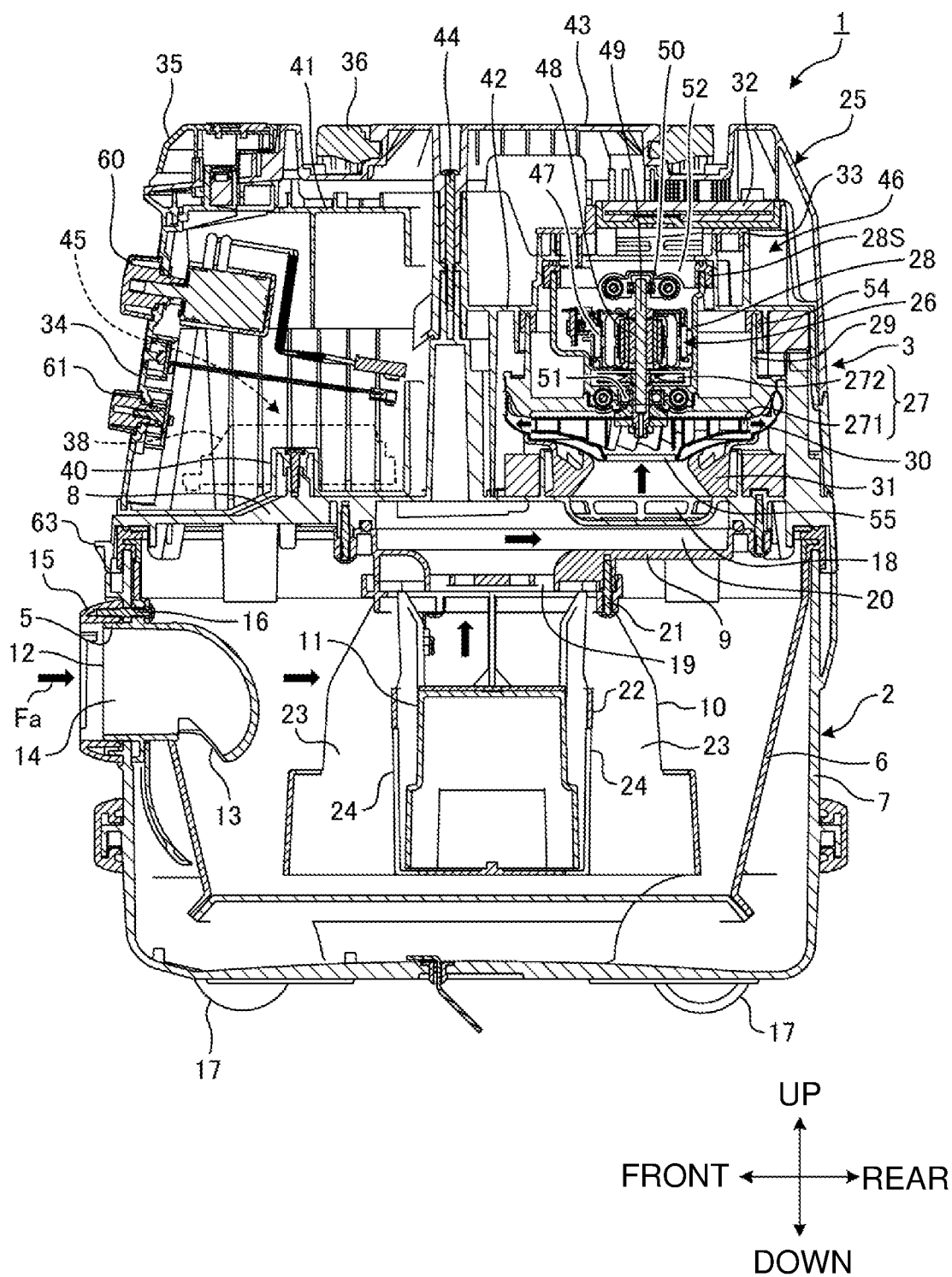
FIG. 3 is a cross-sectional view of the dust collector according to the embodiment.
Figure 4:
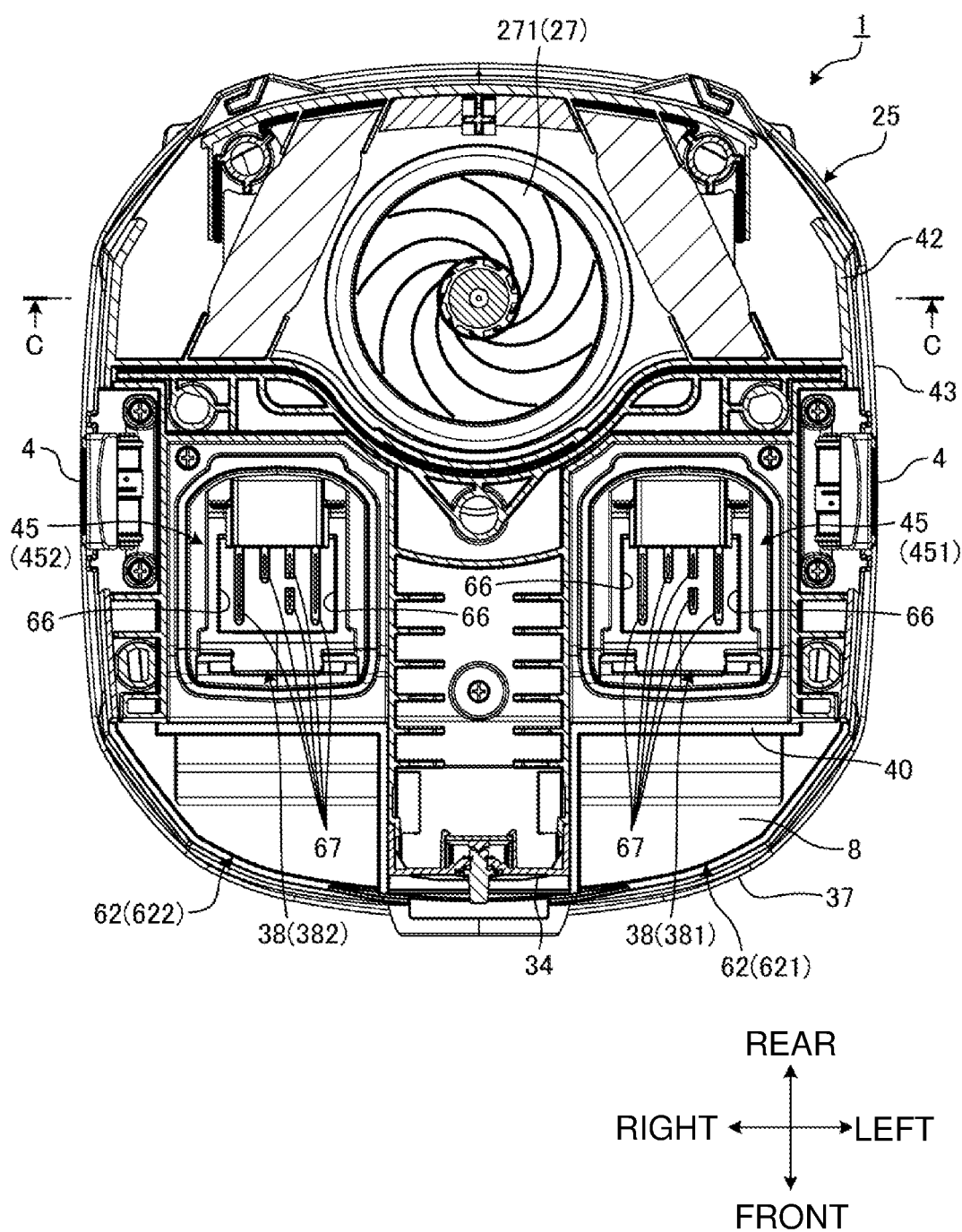
FIG. 4 is a cross-sectional view of the dust collector according to the embodiment.
Figure 5:
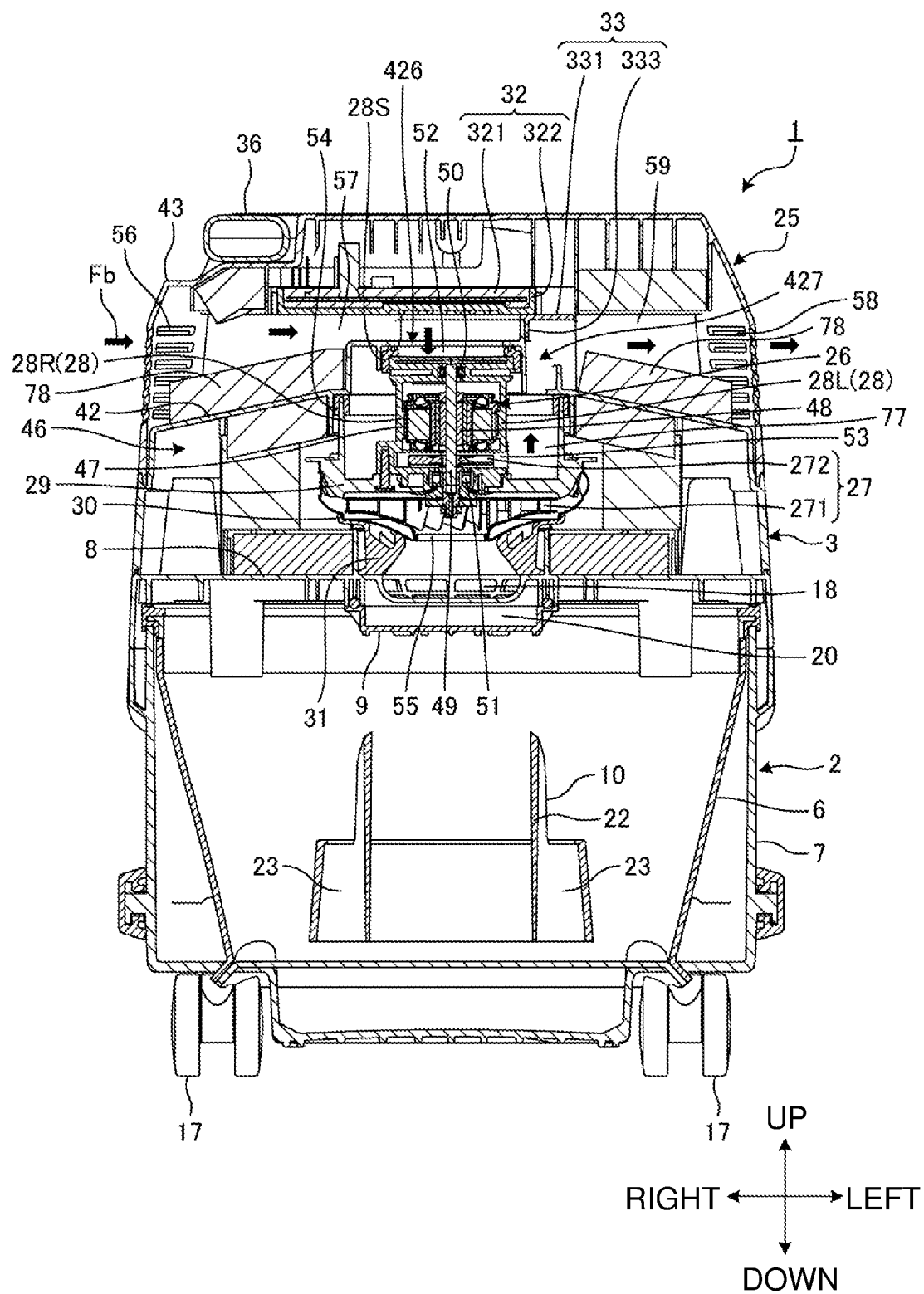
FIG. 5 is a cross-sectional view of the dust collector according to the embodiment.

FIG. 1 is a perspective view of the dust collector 1 according to an embodiment as viewed from the left front. FIG. 2 is a perspective view of the dust collector 1 according to the embodiment as viewed from the right rear. FIGS. 3 to 5 are cross-sectional views of the dust collector 1 according to the embodiment. FIG. 3 is a cross-sectional view taken along line A-A in FIG. 1 as viewed in the direction indicated by arrows. FIG. 4 is a cross-sectional view taken along line B-B in FIG. 1 as viewed in the direction indicated by arrows. FIG. 5 is a cross-sectional view taken along line C-C in FIG. 4 as viewed in the direction indicated by arrows.

The dust collector 1 according to the embodiment is a wet and dry dust collector that can suck liquid as well as gas. The gas is, for example, air. The liquid is, for example, water.

As shown in FIGS. 1 to 5, the dust collector 1 includes a tank unit 2, a body 3, and latches 4. The body 3 is located above the tank unit 2. The tank unit 2 supports the body 3. The latches 4 fasten the tank unit 2 and the body 3 together. The latches 4 are on the right and left sides of the tank unit 2.

The tank unit 2 includes a suction tube 5, a tank 6, a tank housing 7, a tank cover 8, a lower tank cover 9, a support 10, and a float 11.

The suction tube 5 sucks in at least one of gas or liquid. The suction tube 5 is at the front of the tank unit 2. The suction tube 5 includes a suction port 12, an exhaust port 13, and a flow channel 14. The flow channel 14 connects the suction port 12 and the exhaust port 13.

The suction tube 5 has the suction port 12 at its front end. The suction tube 5 has the exhaust port 13 at its rear end. The suction port 12 is in the front of the tank unit 2. The suction port 12 faces frontward. The exhaust port 13 is located in an internal space of the tank 6. Dust is sucked in through the suction port 12 together with gas or liquid, or both, and then flows into the internal space of the tank 6.

The suction port 12 is connected to a dust collection hose (not shown). The tank unit 2 includes a joint 15. The joint 15 surrounds the front end of the suction tube 5. The joint 15 is fastened to the front of the suction tube 5 and to the front of the tank housing 7 with a screw 16. The dust collection hose is at least partially received in the suction tube 5 through the suction port 12. The dust collection hose is at least partially fastened to the joint 15.

The tank 6 has the internal space to store dust sucked in through the suction port 12. When liquid is sucked in through the suction port 12, the tank 6 stores the liquid. The liquid is stored in the internal space of the tank 6.

The tank housing 7 surrounds the tank 6. The tank housing 7 receives casters 17 in its lower portion. The casters 17 support the tank unit 2 in a movable manner. The tank unit 2 supporting the body 3 moves with the casters 17 on a target cleaning surface. The user of the dust collector 1 can move the dust collector 1 forward on the target cleaning surface by pulling the dust collector 1 forward using the dust collection hose.

The tank cover 8 covers an opening in an upper portion of the tank 6. The tank cover 8 has a vent 18.

The lower tank cover 9 is fastened to the lower surface of the tank cover 8 with a screw (not shown). The lower tank cover 9 has an inflow port 19 facing the internal space of the tank 6. The tank cover 8 and the lower tank cover 9 define a flow channel 20 between them. The flow channel 20 connects the inflow port 19 and the vent 18.

The support 10 is located in the internal space of the tank 6. The support 10 supports the float 11 in a manner movable in the vertical direction. The support 10 is fastened to the lower surface of the lower tank cover 9 with a screw 21. The support 10 includes a cylinder 22 and multiple plates 23. The plates 23 surround the cylinder 22. The cylinder 22 is surrounded by a filter (not shown). The cylinder 22 has openings 24. The gas or liquid around the cylinder 22 flows into an inner space of the cylinder 22 through the filter and the openings 24. The filter collects dust from the gas or the liquid flowing into the cylinder 22.

The float 11 is located in the internal space of the tank 6, or more specifically, in the inner space of the cylinder 22. The float 11 floats on liquid. When no liquid is in the inner space of the cylinder 22, the float 11 is at the bottom of the cylinder 22. When liquid is sucked into the internal space of the tank 6 through the suction port 12, the liquid flows into the inner space of the cylinder 22 through the openings 24. The float 11 then moves upward following the liquid level (water level) in the inner space of the cylinder 22. The liquid level in the inner space of the cylinder 22 refers to the height of the surface of the liquid (water surface) in the inner space of the cylinder 22. The float 11 moves upward as it is guided by the cylinder 22. The float 11 moves upward with the liquid in the inner space of the cylinder 22 to close the inflow port 19 in the lower tank cover 9.

The body 3 includes a body housing 25, a motor 26, a fan 27, a motor housing 28, a fan base 29, a fan cover 30, a support ring 31, a controller 32, a thermal insulator 33, a switch base 34, a switch button 35, a handle 36, a battery cover 37, and battery mounts 38.

The body housing 25 is supported on the tank unit 2. The body housing 25 includes a lower housing 40, an upper housing 41, a separator housing 42, and a cowling 43.

The lower housing 40 and the upper housing 41 are located in a front portion of the body 3. The separator housing 42 is located in a rear portion of the body 3.

The lower housing 40 is connected to the tank cover 8. The upper housing 41 is located above the lower housing 40. The upper housing 41 is fastened to the tank cover 8 with a screw 44. The lower housing 40 is held between the upper housing 41 and the tank cover 8.

The lower housing 40, the upper housing 41, and the tank cover 8 define battery compartments 45.

The separator housing 42 is connected to the tank cover 8. The separator housing 42 is fastened to the tank cover 8 with a screw (not shown).

The separator housing 42 contains a drive unit compartment 46. The separator housing 42 at least partially separates the battery compartments 45 and the drive unit compartment 46.

The cowling 43 covers the lower housing 40, the upper housing 41, and the separator housing 42.

The motor 26 is accommodated in the body housing 25. The motor 26 in the embodiment is accommodated in the drive unit compartment 46 in the separator housing 42. The motor 26 is a brushless inner-rotor motor. The motor 26 generates power for rotating the fan 27. The motor 26 includes a stator 47, a rotor 48, and a rotor shaft 49. The rotor 48 is located inside the stator 47. The rotor shaft 49 is fixed to the rotor 48. The rotor shaft 49 extends vertically. The rotor shaft 49 is rotatably supported by bearings 50 and 51. The bearings 50 and 51 are ball bearings. The bearing 50 rotatably supports an upper portion of the rotor shaft 49. The bearing 51 rotatably supports a lower portion of the rotor shaft 49. The rotor shaft 49 has its rotation axis extending vertically.

The fan 27 is fixed to the rotor shaft 49. The fan 27 rotates in response to the motor 26. The fan 27 rotates as the rotor shaft 49 rotates. The fan 27 includes a blowing fan 271 and a cooling fan 272. The blowing fan 271 generates a suction force at the suction port 12. The cooling fan 272 generates an airflow to cool the motor 26. The blowing fan 271 is fixed to the lower end of the rotor shaft 49. The cooling fan 272 is fixed to a portion of the rotor shaft 49 between the lower end of the stator 47 and the blowing fan 271. The blowing fan 271 and the cooling fan 272 are centrifugal fans. The blowing fan 271 has a larger outer diameter than the cooling fan 272. The blowing fan 271 and the cooling fan 272 rotate as the rotor shaft 49 rotates.

The motor housing 28 accommodates the motor 26 and the cooling fan 272 in the body housing 25. The motor housing 28 supports the motor 26. The motor housing 28 supports the bearings 50 and 51. The motor housing 28 is cylindrical and dividable into halves. As shown in FIG. 5, the motor housing 28 includes a left motor housing 28L and a right motor housing 28R. The right motor housing 28R is joined to the left motor housing 28L. The motor housing 28 has its upper end receiving an annular seal 28S. The seal 28S is formed from synthetic rubber, such as nitrile rubber (NBR) or silicone rubber. The upper end of the motor housing 28 is joined to the separator housing 42 with the seal 28S in between. The seal 28S seals the boundary between the upper end of the motor housing 28 and the inner surface of the separator housing 42.

The motor housing 28 is located inside the separator housing 42. More specifically, the motor housing 28 is located in the drive unit compartment 46. The motor housing 28 accommodates the motor 26 and the cooling fan 272 in the separator housing 42. The motor 26 and the cooling fan 272 are located in an internal space of the motor housing 28. The motor housing 28 has a motor inlet 52 in its upper end and a motor outlet 53 in a lower portion of its side surface. The gas around the motor housing 28 flows into the internal space of the motor housing 28 through the motor inlet 52. The gas inside the internal space of the motor housing 28 flows out of the motor housing 28 through the motor outlet 53.

The fan base 29 surrounds and supports the motor housing 28. The fan base 29 is formed from a synthetic resin, such as a polycarbonate resin. The fan base 29 has its upper end receiving an annular seal 54. The seal 54 is formed from synthetic rubber, such as NBR or silicone rubber. The upper end of the fan base 29 is joined to the separator housing 42 with the seal 54 in between. The seal 54 seals the boundary between the upper end of the fan base 29 and the inner surface of the separator housing 42.

The fan cover 30 covers at least a part of the blowing fan 271. The fan cover 30 is supported on the fan base 29. The fan cover 30 at least partially surrounds the blowing fan 271. The fan cover 30 is at least partially located below the blowing fan 271. The fan cover 30 has a fan inlet 55 in its lower portion. The fan inlet 55 is located above the vent 18 in the tank cover 8. The fan inlet 55 faces the vent 18. The fan cover 30 has a vent in a portion adjacent to the blowing fan 271.

The support ring 31 supports the lower surface of the fan cover 30. The support ring 31 is annular and is formed from synthetic rubber, such as NBR or silicone rubber. The support ring 31 is supported on the tank cover 8. The support ring 31 is in tight contact with the lower surface of the fan cover 30 and with the upper surface of the tank cover 8. The support ring 31 seals the boundary between the fan cover 30 and the tank cover 8.

The blowing fan 271 rotates to generate a suction force at the suction port 12. As shown by arrow Fa in FIG. 3, the gas sucked into the internal space of the tank 6 through the suction port 12 flows into the inner space of the cylinder 22 in the support 10 through the openings 24 and then into the inflow port 19 in the lower tank cover 9. The gas then flows through the flow channel 20 between the lower tank cover 9 and the tank cover 8 and through the vent 18 and the support ring 31. The gas then flows into the blowing fan 271 through the fan inlet 55 and flows out of the fan cover 30 through the vent in the fan cover 30.

As the cooling fan 272 rotates, the gas around the motor housing 28 flows into the internal space of the motor housing 28 through the motor inlet 52 to cool the motor 26. The gas then flows out of the motor housing 28 through the motor outlet 53.

The body housing 25 in the embodiment has cooling inlets 56, an intake channel 57, cooling outlets 58, and an exhaust channel 59. The cooling inlets 56 are located in a right rear portion of the body housing 25. The cooling inlets 56 connect the outside and the inside of the body housing 25. The cooling outlets 58 are located in a left rear portion of the body housing 25. The cooling outlets 58 connect the inside and the outside of the body housing 25. The intake channel 57 is defined in an internal space of the body housing 25. The intake channel 57 connects the cooling inlets 56 to the motor inlet 52. The exhaust channel 59 is defined in the internal space of the body housing 25. The exhaust channel 59 connects the motor outlet 53 to the cooling outlets 58.

As shown by arrow Fb in FIG. 5, in response to rotation of the cooling fan 272, the gas for cooling the motor 26 flows into the intake channel 57 through the cooling inlets 56. The gas flowing through the intake channel 57 then flows into the internal space of the motor housing 28 through the motor inlet 52 to cool the motor 26. The gas then flows into the exhaust channel 59 through the motor outlet 53. The gas flowing through the exhaust channel 59 then flows out of the body housing 25 through the cooling outlets 58.

When liquid is sucked in through the suction port 12, the liquid is stored in the internal space of the tank 6. When the water level in the inner space of the cylinder 22 in the support 10 rises, the float 11 moves upward. The float 11, which has moved upward, closes the inflow port 19 in the lower tank cover 9. This closes the flow channel 20 communicating with the fan inlet 55 in the fan cover 30. In other words, the float 11 moves upward with the liquid in the inner space of the cylinder 22 to close the flow channel 20 that communicates with the fan inlet 55. The inflow port 19 in the lower tank cover 9 is closed by the float 11 and the flow channel 20 is thus closed, reducing entry of the liquid into the drive unit compartment 46.

Although the fan inlet 55 is closed, the rotating cooling fan 272 can cool the motor 26.

The controller 32 includes a computer system. The controller 32 outputs control signals for controlling an electronic device incorporated in the dust collector 1. The electronic device includes the motor 26. The controller 32 outputs control signals for controlling the motor 26. The controller 32 includes a control board on which multiple electronic components are mounted. Examples of the electronic components mounted on the control board include a processor such as a central processing unit (CPU), a nonvolatile memory such as a read-only memory (ROM) or a storage device, a volatile memory such as a random-access memory (RAM), a transistor, a capacitor, and a resistor.

The thermal insulator 33 is located between the motor 26 and the controller 32. The thermal insulator 33 in the embodiment supports the controller 32. The thermal insulator 33 is located at the top of the separator housing 42.

The switch base 34 is located at the front of the body housing 25. The switch base 34 is a plate elongated in the vertical direction. The switch base 34 includes a main power switch 60 and a suction force adjustment switch 61. The main power switch 60 and the suction force adjustment switch 61 are located on the switch base 34. The main power switch 60 and the suction force adjustment switch 61 are arranged in the vertical direction. The suction force adjustment switch 61 in the embodiment is located below the main power switch 60. The suction force adjustment switch 61 may be located above the main power switch 60.

The switch button 35 is located at the front of the body housing 25 and above the switch base 34. The switch button 35 is supported by the body housing 25 in a pivotable manner.

The handle 36 is supported in an upper portion of the body housing 25 in a pivotable manner. The handle 36 is located behind the switch button 35. The user of the dust collector 1 carries the dust collector 1 by holding the handle 36.

The body housing 25 has body openings 62 communicating with the battery compartments 45. The body openings 62 are located in the body housing 25. The body openings 62 in the embodiment are located in the front of the body housing 25.

The battery cover 37 is operable to cover and uncover the body openings 62. The battery cover 37 has its upper end pivotably supported on an upper front portion of the body housing 25.

Figure 6:
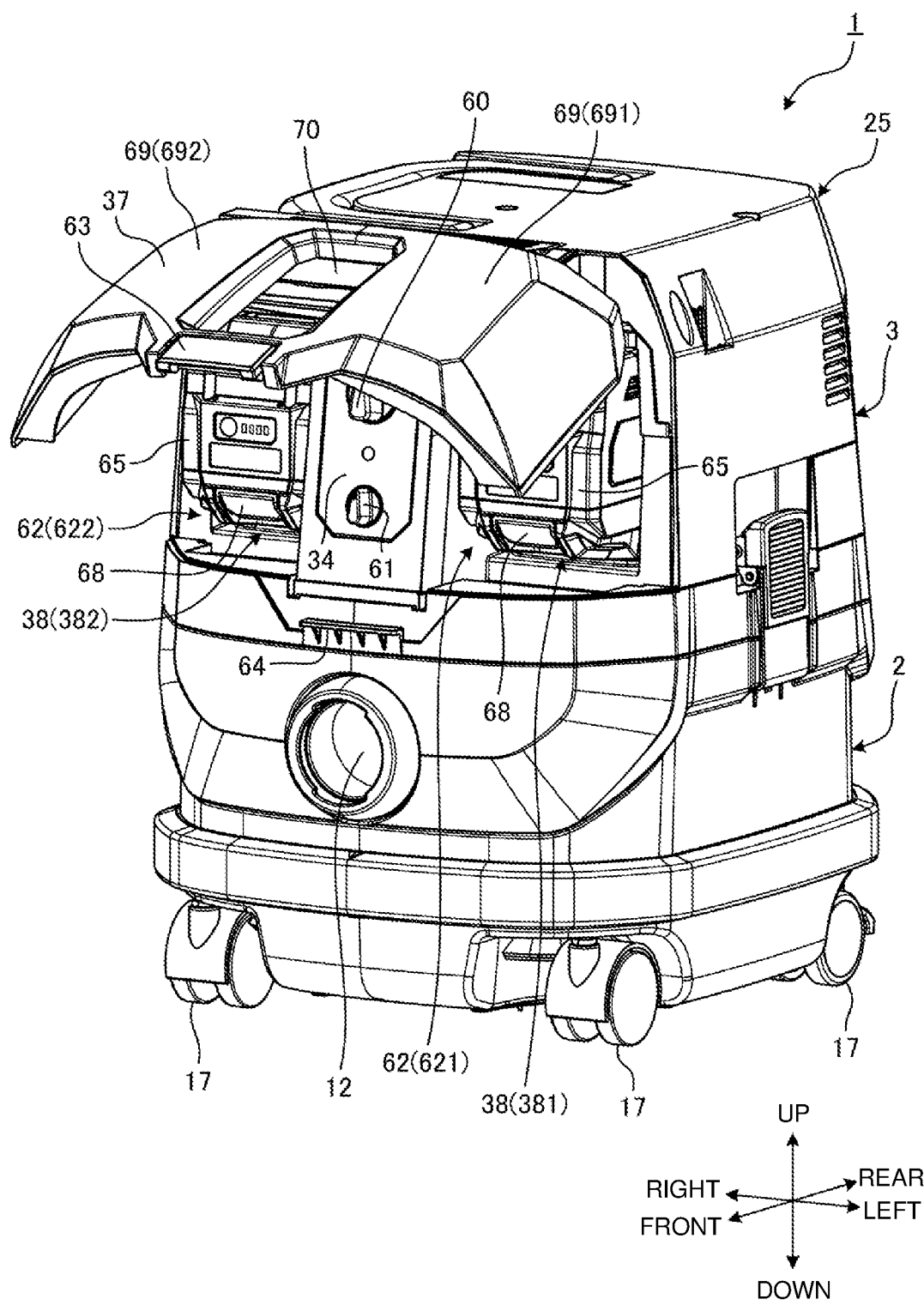
FIG. 6 is a perspective view of the dust collector according to the embodiment with body openings uncovered as viewed from the left front.
Figure 7:
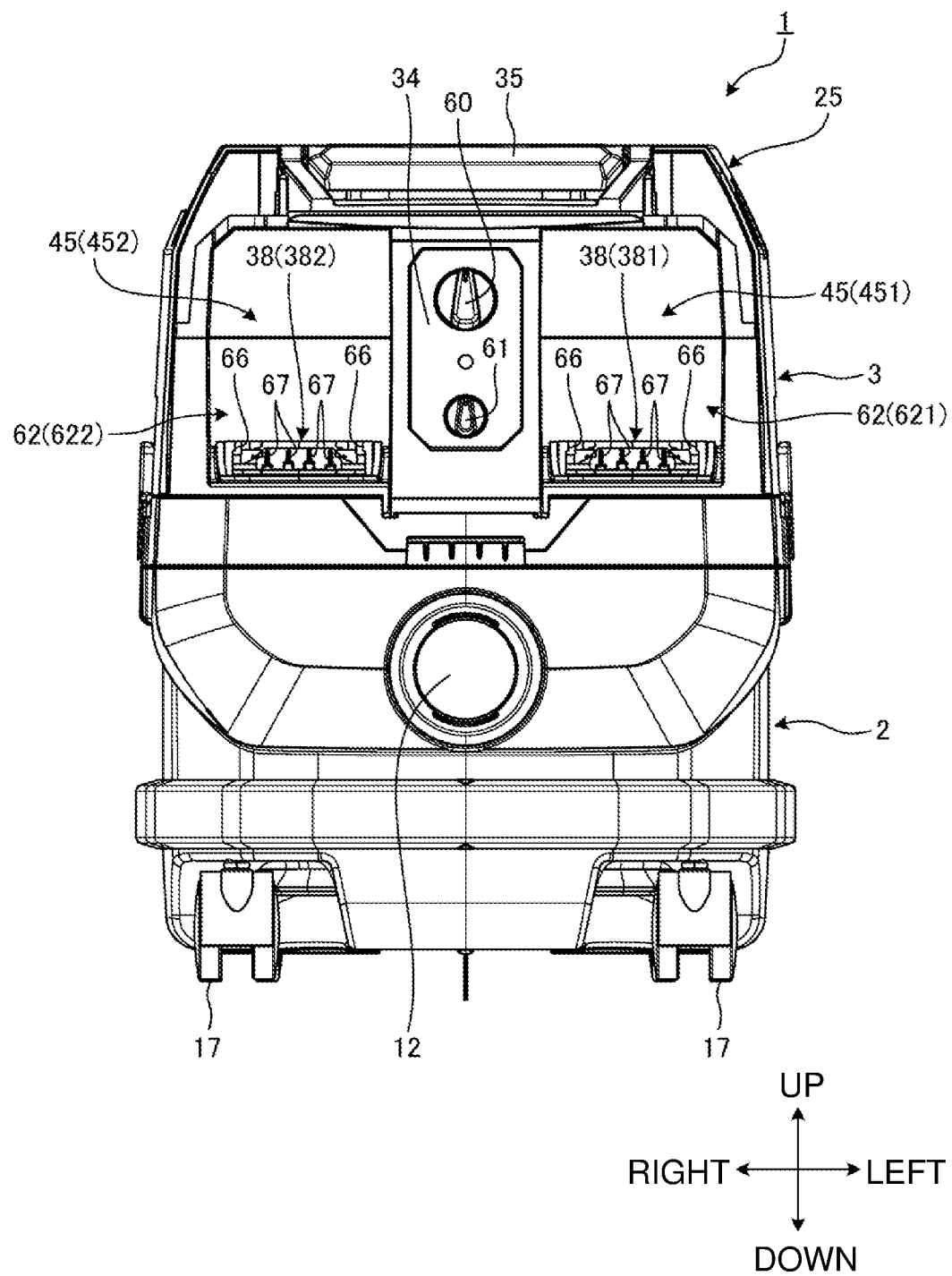
FIG. 7 is a front view of the dust collector according to the embodiment without a battery cover.

FIG. 6 is a perspective view of the dust collector 1 according to the embodiment with the body openings 62 uncovered as viewed from the left front. FIG. 7 is a front view of the dust collector 1 according to the embodiment without the battery cover 37.

Each body opening 62 communicates with the corresponding battery compartment 45. The body openings 62 are located in the front of the body housing 25. The battery cover 37 is operable to cover and uncover the body openings 62. In the embodiment, the battery cover 37 has its upper end pivotably supported on the upper front portion of the body housing 25. The upper end of the battery cover 37 is hinged to the upper front portion of the body housing 25. The battery cover 37 has a hinge axis extending laterally. The battery cover 37 is supported on the body housing 25 to have its lower end rotatable in the vertical direction.

A lock lever 63 is located at the lower end of the battery cover 37. A hook 64 is located on the front surface of the body housing 25. The hook 64 is located below the switch base 34 and the body openings 62. The lock lever 63 is engaged with the hook 64 to fasten the battery cover 37 to the body housing 25.

The battery mounts 38 are located frontward from the motor 26 in the body housing 25. Each battery mount 38 is located in the corresponding battery compartment 45. Each body opening 62 communicates with the corresponding battery mount 38. A battery pack 65 is attachable to and detachable from the battery mount 38.

The battery pack 65 serves as a power supply for the dust collector 1. When mounted on the battery mount 38, the battery pack 65 powers the electronic device incorporated in the dust collector 1. The motor 26 runs on power supplied from the battery pack 65. The controller 32 operates on power supplied from the battery pack 65. The battery pack 65 is a general-purpose battery usable as a power supply for various electrical instruments. The battery pack 65 is usable for powering power tools. The battery pack 65 is usable for powering electrical instruments other than power tools. The battery pack 65 is usable for powering dust collectors other than the dust collector 1 according to the embodiment. The battery pack 65 includes a lithium-ion battery. The battery pack 65 includes a rechargeable battery. The battery mount 38 has the same structure as a battery mount included in a power tool.

The switch base 34 is adjacent to the body openings 62. The battery mounts 38 in the embodiment include a first battery mount 381 and a second battery mount 382. The first battery mount 381 is located leftward from the switch base 34. The second battery mount 382 is located rightward from the switch base 34. The battery compartments 45 include a first battery compartment 451 and a second battery compartment 452. The first battery compartment 451 receives the first battery mount 381. The second battery compartment 452 receives the second battery mount 382. The body openings 62 include a first body opening 621 and a second body opening 622. The first body opening 621 communicates with the first battery mount 381. The second body opening 622 communicates with the second battery mount 382.

The battery cover 37 includes a cover 69 and a cover opening 70. The cover 69 covers the body openings 62. The cover opening 70 receives the switch base 34. The cover 69 includes a first cover portion 691 and a second cover portion 692. The first cover portion 691 covers the first body opening 621. The second cover portion 692 covers the second body opening 622. When the cover 69 covers the body openings 62, the switch base 34 has its surface received in the cover opening 70. The switch base 34 is exposed through the cover opening 70.

Battery Mount

Figure 8:
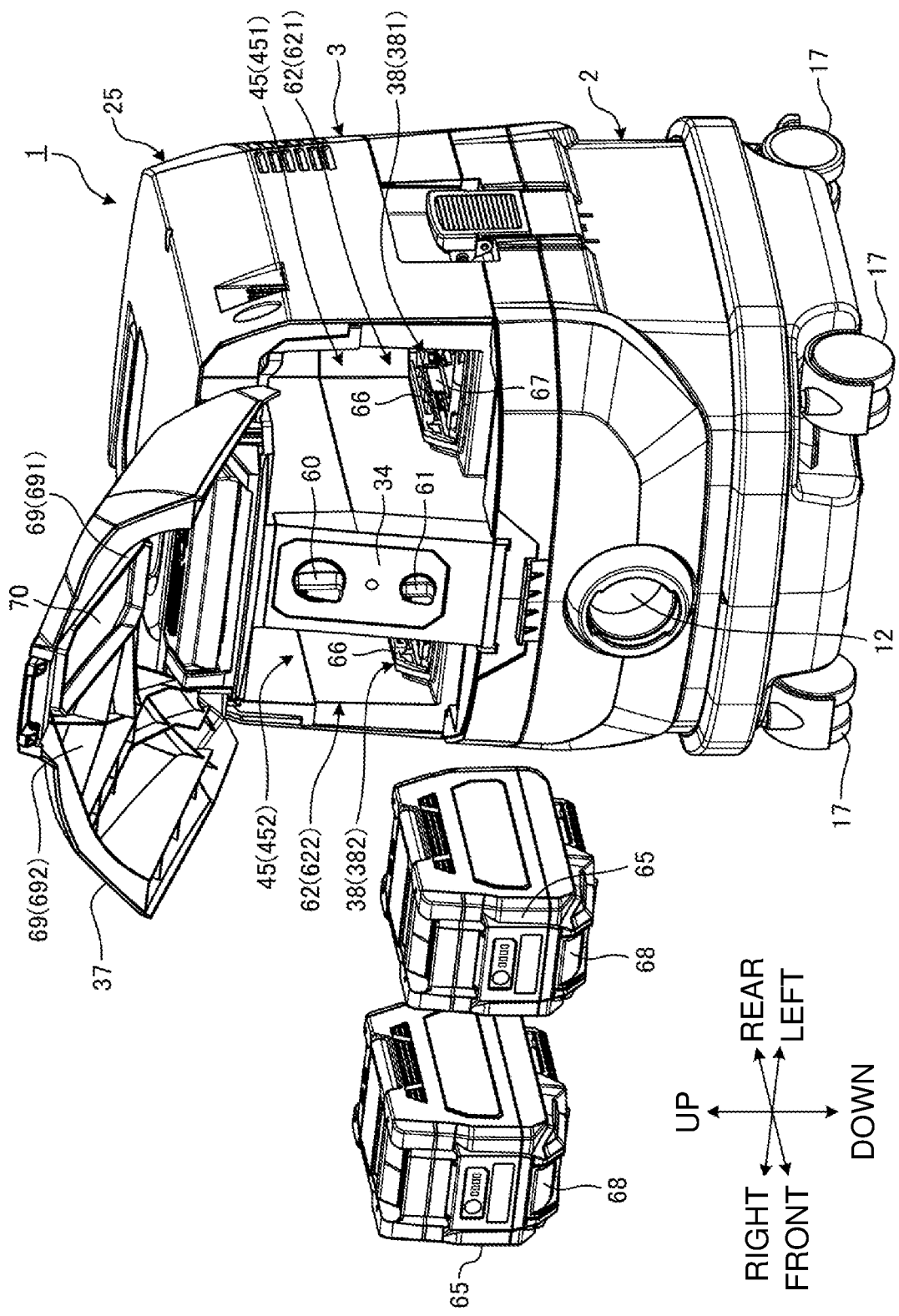
FIG. 8 is a perspective view of battery packs in the embodiment being attached to battery mounts as viewed from the left front.

FIG. 8 is a perspective view of the battery packs 65 in the embodiment being attached to the battery mounts 38 as viewed from the left front.

The user of the dust collector 1 attaches and detaches the battery packs 65 to and from the battery mounts 38. Each battery mount 38 includes guides 66 and body terminals 67. Each battery pack 65 includes battery terminals. The guides 66 on the battery mount 38 guide the battery pack 65 placed through the body opening 62 in a horizontal direction.

In the embodiment, the horizontal direction refers to a direction parallel to a plane including a front-rear axis parallel to the front-rear direction and a lateral axis parallel to the lateral direction.

In an embodiment, the guides 66 guide the battery pack 65 in the front-rear direction.

The body terminals 67 on the battery mount 38 are connectable to the battery terminals on the battery pack 65. The user places the battery pack 65 onto the battery mount 38 from the front of the battery mount 38 and moves the battery pack 65 backward. The battery pack 65 is thus attached to the battery mount 38. The battery pack 65 moves backward as it is guided by the guides 66 on the battery mount 38. This allows the battery pack 65 to be attached to the battery mount 38. The battery terminals on the battery pack 65 are thus electrically connected to the body terminals 67 on the battery mount 38. The battery pack 65 includes a release button 68. The user of the dust collector 1 operates the release button 68 and moves the battery pack 65 forward to remove the battery pack 65 from the battery mount 38.

The first battery mount 381 and the second battery mount 382 are electrically connected in parallel. When a battery pack 65 is attached to the first battery mount 381 without another battery pack 65 attached to the second battery mount 382, the electronic device incorporated in the dust collector 1 is operable on power supplied from the battery pack 65 attached to the first battery mount 381. When a battery pack 65 is attached to the second battery mount 382 without another battery pack 65 attached to the first battery mount 381, the electronic device incorporated in the dust collector 1 is operable on power from the battery pack 65 attached to the second battery mount 382.

The main power switch 60 switches between supplying power and stopping supplying power from the battery pack 65 to the dust collector 1. The suction force adjustment switch 61 adjusts the rotational speed per unit time of the motor 26. This adjusts the suction force at the suction port 12.

The switch button 35 is operable to switch the motor 26 between a driving state and a stopping state while the battery pack 65 is supplying power to the dust collector 1.

Thermal Insulator

Figure 9:
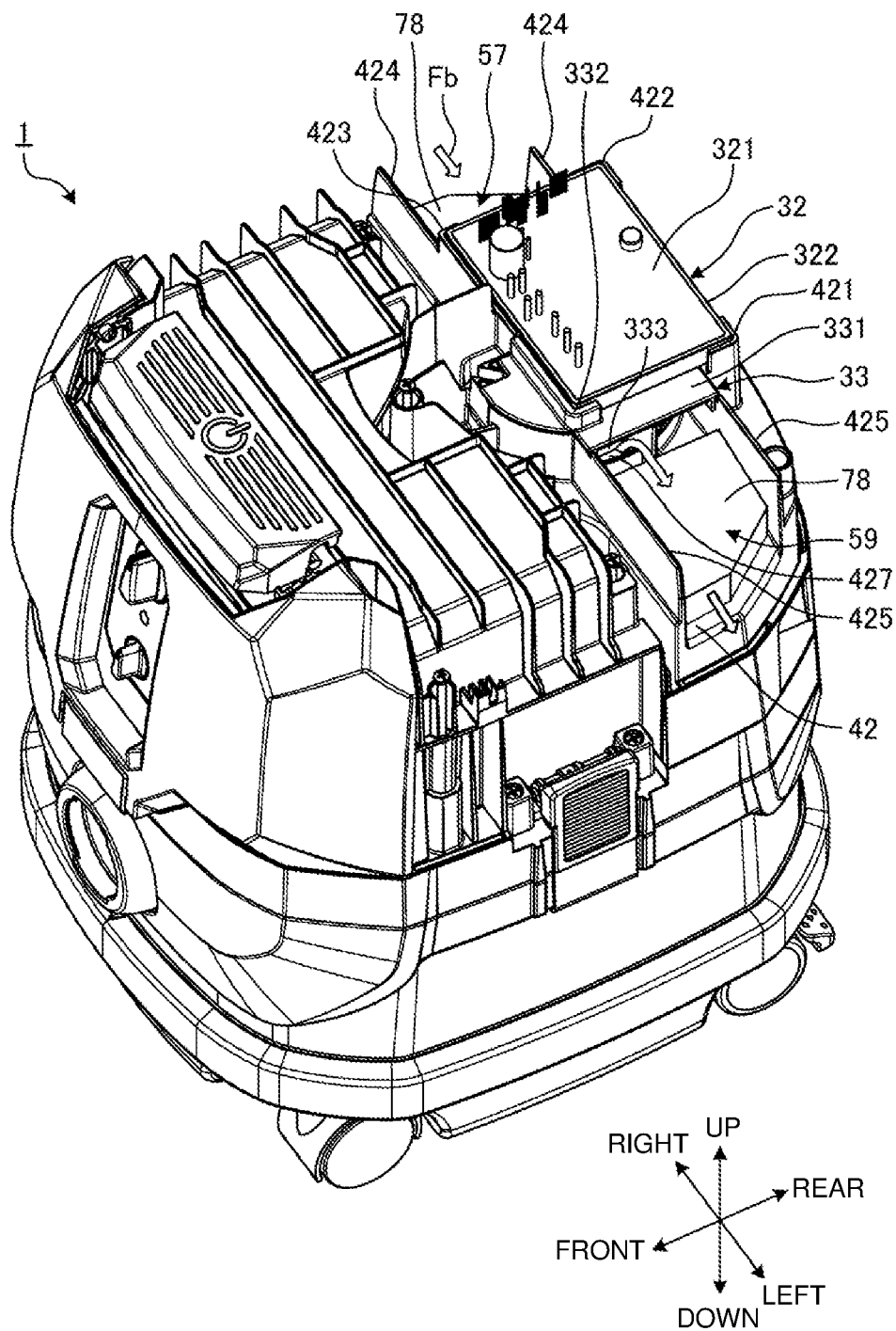
FIG. 9 is a perspective view of the dust collector without a cowling in the embodiment as viewed from the upper left.
Figure 10:
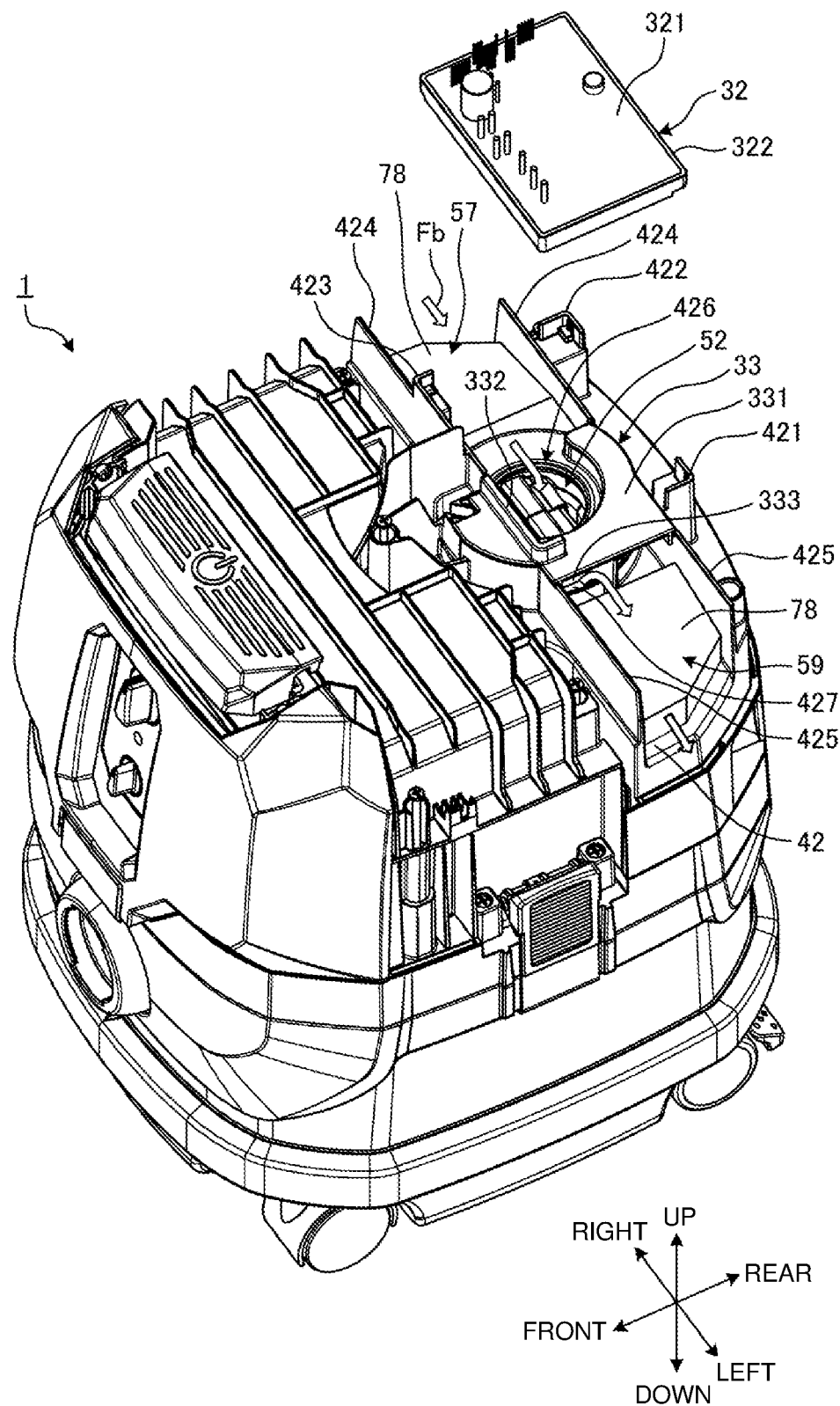
FIG. 10 is an exploded perspective view of the dust collector without the cowling in the embodiment as viewed from the upper left.

FIG. 9 is a perspective view of the dust collector 1 without the cowling 43 in the embodiment as viewed from the upper left. FIG. 10 is an exploded perspective view of the dust collector 1 without the cowling 43 in the embodiment as viewed from the upper left.

As shown in FIGS. 5, 9, and 10, the thermal insulator 33 is located between the motor 26 and the controller 32. The thermal insulator 33 reduces transfer of heat from the motor 26 to the controller 32.

The thermal insulator 33 is at least partially located between the motor outlet 53 and the controller 32. The thermal insulator 33 reduces transfer of heat from gas discharged through the motor outlet 53 to the controller 32. The thermal insulator 33 reduces flow of the gas discharged through the motor outlet 53 hitting the controller 32. More specifically, the thermal insulator 33 reduces transfer of heat from the gas that has cooled the motor 26 to the controller 32. The thermal insulator 33 reduces flow of the gas that has cooled the motor 26 hitting the controller 32.

The thermal insulator 33 has lower thermal conductivity than the separator housing 42. The thermal insulator 33 in the embodiment is formed from synthetic rubber, such as NBR or silicone rubber.

The controller 32 is located above the motor 26. The controller 32 is located above the thermal insulator 33. The motor 26 is located below the thermal insulator 33.

The thermal insulator 33 is located above the motor housing 28. The thermal insulator 33 is located at the top of the separator housing 42.

The thermal insulator 33 supports the controller 32. The thermal insulator 33 includes a plate 331, a rib 332, and a partition 333.

The plate 331 faces the lower surface of the controller 32. The plate 331 has its upper surface in contact with the lower surface of the controller 32.

The rib 332 protrudes upward from the upper surface of the plate 331. The rib 332 at least partially surrounds the controller 32. The rib 332 is in contact with at least a part of the controller 32. The rib 332 positions the controller 32.

As shown in FIG. 5, the partition 333 protrudes downward from the lower surface of the plate 331.

The controller 32 includes a control board 321 and a controller case 322. The control board 321 receives multiple electronic components. The controller case 322 accommodates the control board 321. The controller 32 in the embodiment has its lower surface including the lower surface of the controller case 322. The controller 32 has its side surfaces including the side surfaces of the controller case 322.

The controller case 322 is rectangular. The rib 332 is in contact with the left front corner of the controller case 322. The separator housing 42 includes a rib 421, a rib 422, and a rib 423. The rib 421 is in contact with the left rear corner of the controller case 322. The rib 422 is in contact with the right rear corner of the controller case 322. The rib 423 is in contact with the right front corner of the controller case 322. The controller 32 is positioned by the ribs 332, 421, 422, and 423.

The thermal insulator 33 defines a flow channel through which the airflow generated by the cooling fan 272 passes. The flow channel through which the airflow generated by the cooling fan 272 passes includes the exhaust channel 59 that connects to the motor outlet 53. The flow channel through which the airflow generated by the cooling fan 272 passes includes the intake channel 57 that connects to the motor inlet 52.

The intake channel 57 is located rightward from the exhaust channel 59. The intake channel 57 and the exhaust channel 59 each extend laterally.

The intake channel 57 is at least partially defined by the separator housing 42 and the cowling 43. As shown in FIGS. 9 and 10, the separator housing 42 includes a pair of intake ribs 424. The intake ribs 424 protrude upward from the upper surface of the separator housing 42.

The intake ribs 424 each extend laterally. The intake ribs 424 are arranged in the front-rear direction. The cowling 43 covers the intake ribs 424. The upper surface of the separator housing 42, the pair of intake ribs 424, and the cowling 43 define a space that is at least a part of the intake channel 57.

The exhaust channel 59 is at least partially defined by the separator housing 42 and the cowling 43. As shown in FIGS. 9 and 10, the separator housing 42 includes a pair of exhaust ribs 425. The exhaust ribs 425 protrude upward from the upper surface of the separator housing 42. The exhaust ribs 425 each extend laterally. The exhaust ribs 425 are arranged in the front-rear direction. The cowling 43 covers the exhaust ribs 425. The upper surface of the separator housing 42, the pair of exhaust ribs 425, and the cowling 43 define a space that is at least a part of the exhaust channel 59.

The separator housing 42 has an inlet 426 and an outlet 427. The inlet 426 communicates with the motor inlet 52. The outlet 427 communicates with the motor outlet 53. The inlet 426 is located above the motor inlet 52. The outlet 427 is located leftward from the inlet 426. As shown in FIG. 5, a flow channel 77 is defined between a left portion of the motor housing 28 and the fan base 29. Gas discharged through the motor outlet 53 flows through the flow channel 77. The outlet 427 is located above the flow channel 77.

The intake channel 57 and the exhaust channel 59 each accommodate a sound absorber 78. The sound absorbers 78 are, for example, porous members formed from a synthetic resin.

The thermal insulator 33 at least partially separates the intake channel 57 and the exhaust channel 59. As shown in FIG. 5, the partition 333 in the thermal insulator 33 separates the intake channel 57 and the exhaust channel 59. The partition 333 is located between the intake channel 57 and the exhaust channel 59 in the lateral direction. The thermal insulator 33 is in contact with the separator housing 42. The thermal insulator 33 seals the boundary between the intake channel 57 and the exhaust channel 59.

The thermal insulator 33 partially surrounds the inlet 426. The thermal insulator 33 does not cover the inlet 426. The thermal insulator 33 is at least partially located above the outlet 427. The thermal insulator 33 at least partially faces the outlet 427 with a clearance between them. The thermal insulator 33 supported by the separator housing 42 does not cover the outlet 427.

The intake channel 57 is at least partially defined by the separator housing 42 and the controller 32. The plate 331 supports a part of the controller 32. The controller 32 is at least partially located above the inlet 426. The controller 32 supported by the thermal insulator 33 does not cover the inlet 426. The controller 32 is at least partially located above the upper surface of the separator housing 42. The controller 32 has its lower surface portion located rightward from the inlet 426 and uncovered by the plate 331 in the thermal insulator 33. The lower surface portion of the controller 32 located rightward from the inlet 426 faces the intake channel 57. More specifically, the controller 32 has its lower surface portion partially uncovered by the thermal insulator 33 in the intake channel 57. The controller 32 is thus partially exposed to the intake channel 57. The upper surface of the separator housing 42, the pair of intake ribs 424, and the lower surface portion of the controller 32 define a space that is at least a part of the intake channel 57.

The intake channel 57 is at least partially defined by the separator housing 42 and the thermal insulator 33. The rib 332 on the thermal insulator 33 is at least partially located frontward from the inlet 426. The rib 332 connects to the intake rib 424. The rib 332 defines at least a part of the intake channel 57.

The exhaust channel 59 is at least partially defined by the separator housing 42 and the thermal insulator 33. The plate 331 in the thermal insulator 33 is at least partially located above the outlet 427. The plate 331 does not cover the outlet 427. The plate 331 is at least partially located above the upper surface of the separator housing 42. The plate 331 connects to the exhaust ribs 425. The controller 32 has its lower surface portion located leftward from the inlet 426 and covered by the plate 331 in the thermal insulator 33. The lower surface portion of the controller 32 located leftward from the inlet 426 is unexposed to the exhaust channel 59. More specifically, the controller 32 has its lower surface portion covered by the thermal insulator 33 in the exhaust channel 59. The controller 32 is thus unexposed to the exhaust channel 59. The upper surface of the separator housing 42, the pair of exhaust ribs 425, and the lower surface of the plate 331 defines a space that is at least a part of the exhaust channel 59.

As described above, the thermal insulator 33 is located between the motor 26 and the controller 32 in the embodiment. The thermal insulator 33 reduces transfer of heat from the motor 26 or heat from the gas that has cooled the motor 26 to the controller 32. The thermal insulator 33 defines a flow channel through which the airflow generated by the cooling fan 272 passes. The airflow passing through the flow channels defined by the thermal insulator 33 effectively cools the controller 32.

The motor 26 is accommodated in the motor housing 28. The motor housing 28 has the motor inlet 52 and the motor outlet 53. The thermal insulator 33 defines at least a part of the exhaust channel 59 that connects to the motor outlet 53.

The thermal insulator 33 defines at least a part of the intake channel 57 that connects to the motor inlet 52.

The controller 32 is unexposed to the exhaust channel 59. The controller 32 is covered by the thermal insulator 33 in the exhaust channel 59. The gas then flows through the exhaust channel 59 after cooling the motor 26. The thermal insulator 33 reduces flow of the gas that has cooled the motor 26 hitting the controller 32. This reduces transfer of heat from the gas that has cooled the motor 26 to the controller 32.

The controller 32 is at least partially exposed to the intake channel 57. The controller 32 is uncovered by the thermal insulator 33 in the intake channel 57. Before cooling the motor 26, the gas flows through the intake channel 57. The gas hits the controller 32 before cooling the motor 26, thus effectively cooling the controller 32.

The partition 333 in the thermal insulator 33 separates the intake channel 57 and the exhaust channel 59. This reduces mixing of the gas flowing through the intake channel 57 with the gas flowing through the exhaust channel 59.

The thermal insulator 33 is at least partially located between the motor outlet 53 and the controller 32. This reduces flow of the gas that has cooled the motor 26 hitting the controller 32.

The controller 32 is located above the motor 26. The controller 32 is located above the thermal insulator 33. The motor 26 is located below the thermal insulator 33. This reduces transfer of heat from the motor 26 to the controller 32. The thermal insulator 33 properly defines at least one of the intake channel 57 or the exhaust channel 59.

The thermal insulator 33 supports the controller 32. This effectively reduces transfer of heat from the motor 26 to the controller 32.

The thermal insulator 33 includes the plate 331 facing the lower surface of the controller 32 and the rib 332 at least partially surrounding the controller 32. The thermal insulator 33 positioning the controller 32 thus stably supports the controller 32.

The dust collector 1 according to the embodiment is a wet and dry dust collector that can suck liquid as well as gas. The fan 27 includes the blowing fan 271 that generates a suction force at the suction port 12 and the cooling fan 272 that generates an airflow to cool the motor 26. Although the fan inlet 55 is closed by the float 11, the rotating cooling fan 272 can cool the motor 26.

OTHER EMBODIMENTS

In the above embodiment, the cooling fan 272 may be eliminated. The rotating blowing fan 271 may generate an airflow for fooling the motor 26.

In the above embodiment, the dust collector 1 is a wet and dry dust collector. The dust collector 1 may be a dry dust collector.

REFERENCE SIGNS LIST 1 dust collector
2 tank unit
3 body
4 latch
5 suction tube
6 tank
7 tank housing
8 tank cover
9 lower tank cover
10 support
11 float
12 suction port
13 exhaust port
14 flow channel
15 joint
16 screw
17 caster
18 vent
19 inflow port
20 flow channel
21 screw
22 cylinder
23 plate
24 opening
25 body housing
26 motor
27 fan
28 motor housing
28L left motor housing
28R right motor housing
28S seal
29 fan base
30 fan cover
31 support ring
32 controller
33 thermal insulator
34 switch base
35 switch button
36 handle
37 battery cover
38 battery mount
40 lower housing
41 upper housing
42 separator housing
43 cowling
44 screw
45 battery compartment
46 drive unit compartment
47 stator
48 rotor
49 rotor shaft
50 bearing
51 bearing
52 motor inlet
53 motor outlet
54 seal
55 fan inlet
56 cooling inlet
57 intake channel
58 cooling outlet
59 exhaust channel
60 main power switch
61 suction force adjustment switch
62 body opening
63 lock lever
64 hook
65 battery pack
66 guide
67 body terminal
68 release button
69 cover
70 cover opening
77 flow channel
78 sound absorber
271 blowing fan
272 cooling fan
321 control board 322 controller case
331 plate
332 rib
333 partition
381 first battery mount
382 second battery mount
421 rib
422 rib
423 rib
424 intake rib
425 exhaust rib
426 inlet
427 outlet
451 first battery compartment
452 second battery compartment
621 first body opening
622 second body opening
691 first cover portion
692 second cover portion

What is claimed is:

1. A vacuum cleaner comprising:
a filter; and
a dust collector, the dust collector comprising:
a body housing;
a motor located inside the body housing;
a fan rotatable by the motor;
a controller configured to control the motor;
a thermal insulator between the motor and the controller, the thermal insulator having an upper surface in contact with a lower surface of the controller, and the thermal insulator defining a flow channel through which an airflow generated by the fan passes; and
a motor housing accommodating the motor inside the body housing, the motor housing including a motor inlet and a motor outlet, wherein
the flow channel includes an intake channel connected to the motor inlet and.an exhaust channel connected to the motor outlet, and
the thermal insulator seals a boundary between the intake channel and the exhaust channel.

2. The vacuum cleaner according to claim 1, wherein the thermal insulator covers the controller in the exhaust channel, and the controller is unexposed to the exhaust channel, and
the exhaust channel is at least partially defined by the body housing and the thermal insulator.

3. The vacuum cleaner according to claim 2, wherein the flow channel includes an intake channel connected to the motor inlet.

4. The vacuum cleaner according to claim 2, wherein the thermal insulator is at least partially located between the motor outlet and the controller.

5. The vacuum cleaner according to claim 1, wherein the controller is partially uncovered by the thermal insulator in the intake channel, and the controller is partially exposed to the intake channel, and
the intake channel is at least partially defined by the body housing and the controller.

6. The vacuum cleaner according to claim 5, wherein the thermal insulator at least partially separates the intake channel and the exhaust channel.

7. The vacuum cleaner according to claim 5, wherein the thermal insulator is at least partially located between the motor outlet and the controller.

8. The vacuum cleaner according to claim 1, wherein the thermal insulator at least partially separates the intake channel and the exhaust channel.

9. The vacuum cleaner according to claim 8, wherein the thermal insulator is at least partially located between the motor outlet and the controller.

10. The vacuum cleaner according to claim 1, wherein the thermal insulator is at least partially located between the motor outlet and the controller.

11. The vacuum cleaner according to claim 1, wherein the controller is located above the motor.

12. The vacuum cleaner according to claim 1, wherein the controller is located above the thermal insulator.

13. The vacuum cleaner according to claim 1, wherein the motor is located below the thermal insulator.

14. The vacuum cleaner according to claim 1, wherein the thermal insulator supports the controller.

15. The vacuum cleaner according to claim 1, wherein the thermal insulator includes
a plate facing a lower surface of the controller, and
a rib at least partially surrounding the controller and positioning the controller.

16. The vacuum cleaner according to claim 1, further comprising:
a tank unit supporting the body housing, the tank unit having a suction port, wherein
the fan comprises:
a blowing fan configured to generate a suction force at the suction port; and
a cooling fan configured to generate an airflow to cool the motor, and
the thermal insulator defines the flow channel through which an airflow generated by the cooling fan passes.

17. The vacuum cleaner according to claim 16, further comprising:
a fan cover covering at least a part of the blowing fan, the fan cover having a fan inlet,
wherein the tank unit comprises:
a tank configured to store liquid sucked in through the suction port; and
a float located inside the tank, the float being movable with the liquid to close a flow channel communicating with the fan inlet.

* * * * *